United States Patent [19]

Ide et al.

[11] Patent Number: 4,741,954

[45] Date of Patent: * May 3, 1988

[54] MAGNETIC RECORDING MEDIUM

[75] Inventors: Toshiaki Ide; Tohru Shimozawa, both of Saku; Masaharu Nishimatsu, Komoro, all of Japan

[73] Assignee: TDX Corporation, Tokyo, Japan

[*] Notice: The portion of the term of this patent subsequent to Oct. 21, 2003 has been disclaimed.

[21] Appl. No.: 746,317

[22] Filed: Jun. 19, 1985

[30] Foreign Application Priority Data

Jul. 24, 1984 [JP] Japan ................. 59-152073

[51] Int. Cl.$^4$ .................... G11B 5/64; G11B 5/70
[52] U.S. Cl. ................... 428/323; 427/131; 428/328; 428/329; 428/694; 428/900
[58] Field of Search ............. 428/328, 329, 694, 900; 427/131

[56] References Cited

U.S. PATENT DOCUMENTS

| | | | |
|---|---|---|---|
| 4,310,599 | 1/1982 | Akashi et al. | 428/694 |
| 4,328,935 | 5/1982 | Steel | 428/694 |
| 4,333,985 | 6/1982 | Shirahata et al. | 428/694 |
| 4,390,601 | 6/1983 | Ono et al. | 428/695 |
| 4,416,943 | 11/1983 | Saito | 428/694 |
| 4,544,601 | 10/1985 | Yamaguchi et al. | 428/900 |
| 4,592,952 | 6/1986 | Miyoshi et al. | 427/131 |
| 4,600,638 | 7/1986 | Ishikuro et al. | 427/131 |
| 4,618,535 | 10/1986 | Nishimatsu et al. | 427/131 |

FOREIGN PATENT DOCUMENTS 60-85429  5/1985  Japan ................. 427/130

*Primary Examiner*—Paul J. Thibodeau
*Attorney, Agent, or Firm*—Oblon, Fisher, Spivak, McClelland & Maier

[57] ABSTRACT

A magnetic recording medium comprising a non-magnetic substrate, a magnetic recording layer formed on one side of the substrate and a back coating layer formed on the other side of the substrate, wherein the back coating layer contains an inorganic pigment having a Mohs hardness of at least 5 and carbon black, and the inorganic pigment is in an amount of at most 1/9 by weight relative to the carbon black.

15 Claims, No Drawings

MAGNETIC RECORDING MEDIUM

BACKGROUND OF THE INVENTION

1. Field of the Invention

The present invention relates to a magnetic recording medium having excellent electromagnetic conversion characteristics, high elasticity, running durability and a good winding appearance with minimum abrasion of the back coating layer. More particularly, the present invention relates to a magnetic recording medium having a feature in the composition of the coating layer (i.e. the back coating layer) formed on the rear side of the substrate opposite to the side on which a magnetic recording layer is provided.

2. Description of the Prior Art

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

As one of the conditions required for a magnetic recording medium for high density recording, it has been suggested to improve the coercive force and to make the medium thinner both from the theoretical and experimental points of view. There have been various proposals with respect to the compositions of the binder (binding agent), inorganic filler or lubricant for the back coating layer (e.g. Japanese Examined Patent Publication No. 29769/1982). However, there have been various problems with respect to the running durability (the winding appearance, the abrasion of the back coating layer, or the susceptibility of the back coating layer to scars due to abrupt stopping of the running tape), the adhesion of the back coating layer or calender stains during the process for the preparation (dropouts caused by the abrasion of the back coating layer or the calender stains). Further, none of them is fully satisfactory with respect to the electromagnetic conversion characteristics.

In a recording system presently available in which a magnetic head is employed, the spacing loss between the tape and the head is represented by 54.6 d/λ[dB] where d is a distance between the tape and the head, and λ is a recording wavelength. As is evident from this formula, in a short wave recording system having a high recording density which has been highly in demand recent years for the reason of e.g. abundant information to be recorded, the rate of the decrease in the output attributable to the spacing is extremely great as compared with the long wave recording system. Accordingly, even a fine foreign matter deposited on the tape surface is likely to lead to a failure to detect a pulse which should be detected at the time of reading out the information written in the magnetic recording medium and thus is likely to be detected as a dropout. As the causes for the foreign matters attributable to the dropouts, there may be mentioned magnetic powder fallen off from the magnetic layer of the magnetic recording tape as a result of a deterioration of the magnetic layer due to the repeated exertion of stress, or particles abraded off from the substrate during the tape running or dusts which are electrostatically deposited on the substrate surface and then transferred to the magnetic layer surface. In order to prevent the deposition of foreign matters, there have been proposed a method wherein a coating composition prepared by kneading an inorganic filler such as carbon black or graphite with an organic binder, is coated on the rear side of the substrate opposite to the magnetic layer side of the magnetic recording tape, to provide an antistatic property, or a method wherein the abrasion of the substrate is minimized by making the substrate tough.

In a back coating layer containing an inorganic pigment (filler) and carbon black, it has been considered undesirable to employ an inorganic pigment having high Mohs hardness, since such a hard inorganic pigment is likely to lead to abrasion of the tape guide.

SUMMARY OF THE INVENTION

The present inventors have conducted extensive researches on the composition of the back coating layer to overcome the above difficulties, and have found that when an inorganic pigment having a Mohs hardness of at least 5 is incorporated in a back coating layer in a certain ratio to carbon black, i.e. when the inorganic pigment having such high Mohs hardness is incorporated in a small amount of at most 1/9 by weight relative to the carbon black, it is possible to improve the abrasion resistance, the tape winding appearance, etc. and thereby to solve the above difficulties, and the reinforcing effects for carbon black will be remarkable and the elasticity of the layer increases. The present invention has been accomplished on the basis of these discoveries.

Namely, the present invention provides a magnetic recording medium comprising a non-magnetic substrate, a magnetic recording layer formed on one side of the substrate and a back coating layer formed on the other side of the substrate, wherein the back coating layer contains an inorganic pigment having a Mohs hardness of at least 5 and carbon black, and the inorganic pigment is in an amount of at most 1/9 by weight relative to the carbon black.

By the incorporation of carbon black to a back coating layer, it is possible to reduce dropouts by virtue of the antistatic effects of the carbon black. When an inorganic pigment having a Mohs hardness of at least 5 is further added in an amount of at most 1/9 by weight relative to the carbon black, the strength of the back coating layer increases, whereby the abrasion can be avoided, and the weakness of the carbon black is complemented, and the elasticity will be improved, whereby the formation of fine cracks in the back coating layer can be avoided. Further, a proper stiffness can be attained, which is an improvement for the prevention of the cinching phenomenon.

DETAILED DESCRIPTION OF THE INVENTION

The inorganic pigment having a Mohs hardness of at least 5 to be used in the present invention, includes $TiO_2$, $SnO_2$, $SiO_2$, $\alpha$-$Fe_2O_3$, $Fe_3O_4$, $FeS_2$, $MgO$, $ZrO_2$, silicon carbide, chromium oxide, garnet, $K_2O$, $BeO$, $Al_2O_3$, $NiO$, $FeCr_2O_4$, $MgTiO_2$, $FeS_2$, $FeAl_2O_4$, $CaTiO_2$, $FeTiO_2$, $MnO_2$, $ZrSiO_4$, $ZnS$, $ZrO_2$, etc. Among them, $SiO_2$, $SnO_2$, $Al_2O_3$ and $TiO_2$ are preferred. $SiO_2$, $Al_2O_3$ and $TiO_2$ are most effective in that when they were incorporated in a back coating layer, they provided proper reinforcing effects so that formation of cracks in the back coating layer can be avoided. Thus, they provide a back coating layer having excellent durability for repeated running.

The particle size of these inorganic pigments is not particularly limited. However, it is usually preferred to employ an inorganic pigment having a particle size of at most 0.5 μm, and it is particularly preferred to employ one having a particle size of at least 0.04 μm. If the particle size is less than 0.04 μm, even when the Mohs hardness is high, the reinforcing effects for the back coating layer tend to be low as compared with the one having a particle size of at least 0.04 μm. This is believed attributable to that the surface hardness of fine particulate pigments having a size of less than 0.04 μm is different from that of a pigment having a larger particle size. According to the present invention, the physical properties of the back coating layer can be improved merely by adding a small amount, relative to the carbon black, of an inorganic pigment having a Mohs hardness of at least 5 and preferably having a size of at least 0.04 μm.

As the carbon black to be used for the present invention, there may be employed any carbon black produced by any one of conventional methods, such as furnace, channel, acetylene, thermal, lamp or graphitized carbon black. However, acetylene black, furnace black, channel black, roller and disc black, German naphthalene black and graphitized carbon black are preferred. The particle size of the carbon black to be used in the present invention may be at any level, but is preferably from 10 to less than 100 mμm, more preferably from 20 to 80 mμm, as measured by an electron microscopic photography. With respect to the particle size, it should be further mentioned that if the particle size is 100 mμm or greater, the antistatic effect of the back coating layer tends to be poor, the roughness of the back coating layer surface tends to be great and thus is likely to roughen the magnetic layer when the magnetic recording medium is wound up as a magnetic tape, or the electromagnetic conversion characteristics tend to be inferior. The Young's modulus of elasticity of the back coating layer is adequately high when the particle size is less than 100 mμm. However, when the particle size exceeds 100 mμm, the Young's modulus of elasticity tends to decrease, and the adhesion of the back coating layer tends to decrease as well. On the other hand, if the particle size is less than 10 mμm, the dispersion of the particles in the coating material for the back coating layer tends to be non-uniform, whereby a uniform dispersion is not obtainable, thus leading to a decrease of the Young's modulus of elasticity. Further, because of the non-uniformity, it is impossible to adequately reduce the electrostatic property of the back coating layer.

Other additives which are commonly used for the back coating layers of this type, such as organic binders, lubricants, dispersing agents or antistatic agents, may be incorporated in the back coating layer of the present invention in a usual manner.

As the resin binder to be used for the back coating layer of the present invention, there may be employed thermoplastic resins, thermosetting resins or reactive resins, or mixtures thereof, which are commonly used for the magnetic recording media. However, from the viewpoint of the strength of the formed coating layer, a thermosetting type resin, particularly radiation curable type resin, is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diacetate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol coplymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. Particularly preferred is a combination comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C). It is advantageous to use a radiation curable resin, since the curing time is short and there will be no transfer of e.g. fillers from the back coating surface to the magnetic layer after the winding up operation. Whereas, in the case of thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

The curing agent to be used in the present invention may be any curing agent which is commonly used for thermosetting resins of this type. Particularly preferred is an isocyanate-type curing agent. For instance, there may be mentioned Kryspon 4565 and 4560 manufactured by Dai-Nippon Ink & Chemicals Co., Colonate L manufactured by Nippon Polyurethane Industry Co. and Takenate XL-1007 manufactured by Takeda Chemical Industries, Ltd.

As the lubricant to be used for the back coating layer of the present invention, there may be mentioned e.g. silicone oil, fluorine oil, a fatty acid, a fatty acid ester, a paraffin, a liquid paraffin or a surfactant as a lubricant which has been commonly used for the back coating layer of this type. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid.

As the silicone, there may be employed a fatty acid-modified silicone or a partially fluorinated silicone may be employed. As the alcohol, there may be employed a higher alcohol. As the fluorine oil, there may be employed those produced by electrolytic substitution, telomerization or oligomerization.

If no lubricant is incorporated, the back coating layer will have a high frictional coefficient, whereby flickering of the image or jitters are likely to be brought about. Further, since the frictional coefficient is especially high under a high temperature running condition, abrasion of the back coating layer is likely to be led, and the tape winding tends to be irregular.

Other additives which are commonly used for the back coating layers of this type, may be employed. For instance, as the antistatic agent, there may be employed a natural surfactant such as saponin; a nonionic surfactant such as an alkylene oxide-type, a glycerine-type or a glycidol-type; a cationic surfactant such as a higher alkyl amine, a quaternary ammonium salt, pyridine or other heterocyclic compounds, phosphonium or a sulfonium; an anionic surfactant containing acid groups such as carboxylic acid groups, sulfonic acid groups, phosphoric acid groups, sulfate groups or phosphate groups; or an amphoteric surfactant such as an amino acid, an amino sulfonic acid or a sulfuric acid or phosphoric acid ester of an amino alcohol.

In the present invention, the inorganic pigment, carbon black, other additives and the organic binder are used in the following ratios. The ratio of carbon black + the inorganic pigment to the organic binder is from $\frac{1}{4}$ to 4/1, and that of the organic binder to the lubricant is 100:20. More preferably, the ratio of carbon black + the inorganic pigment to the organic binder is from $\frac{1}{3}$ to 3/1.

If the amount of the binder is excessive, blocking tends to occur. On the other hand, if the binder is insufficient, adhesion is likely to occur during the calender treatment, such being undesirable.

The thickness of the back coating layer of the present invention is usually within a range of from 0.3 to 10 $\mu$m after being coated and dried.

On the other hand, as the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co compound-adsorbed $\gamma$-$Fe_2O_3$, Co compound-adsorbed $\gamma$-$Fe_3O_4$ inclusive of an intermediately oxidized state with $\gamma$-$Fe_2O_3$ (the Co compound here is meant for e.g. cobalt oxide, cobalt hydroxide, cobalt ferrite or cobalt ion-adsorbed substance, whereby the magnetic anisotropy of cobalt is utilized for the improvement of the coercive force), or iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr or Co-Ni-Cr. Further, a ferrite magnetic substance such as Ba ferrite or Sr ferrite may be mentioned.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have found that a magnetic recording medium with a noise level being sufficiently low and suitable for high density short wave recording is obtainable when the specific surface area as measured by BET method is at least 48 m$^2$/g, the coercive force of the magnetic layer is at least 1000 Oe, and the surface roughness of the magnetic layer is at most 0.08 $\mu$m as a R$_{20}$ value (an average value of 20 values) with a cut off of 0.17 mm by Talystep method. When such a magnetic layer is combined with the back coating layer of the present invention, the cinching phenomenon (the loosening of the tape winding when the tape has been stopped abruptly), dropouts and friction can be reduced. Further, there is a trend that as the base for the magnetic tape, a plastic film made of e.g. polyethylene terephthalate, polyethylene naphthalate, polyimide or polyamide has a thickness as thin as about 11 $\mu$m or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording layer and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the combination with the back coating layer of the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as BH$_4$, a fine powder obtained by coating the surface of iron oxide with a Si compound and dry-reducing the product in H$_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satifies the above-mentioned conditions for the coercive force and the specific surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of at least 48 m$^2$/g, it is advisable to employ a surfactant, an organic titanium coupling agent or a silane coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further to calender treatment.

In a case where a radiation curable binder is used for both the magnetic layer and the back coating layer, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11 $\mu$m or less and the surface hardness of the magnetic layer is small as the hardness of the magnetic metal powder is smaller than the magnetic oxide such as $\gamma$-Fe$_2$O$_3$, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

In addition to the above combination, a combination of the back coating layer of the present invention with a thin ferromagnetic metal film as the magnetic recording layer provides excellent electromagnetic conversion characteristics and good surface roughness and serves to prevent curling and minimize the dropouts.

A top coating layer comprising an antioxidant, an organic binder, a lubricant and an inorganic pigment, may be provided on these magnetic layers.

As described in the foregoing, according to the present invention, an inorganic pigment having a Mohs hardness of at least 5 is incorporated in the back coating layer in an amount of at most 1/9 by weight relative to carbon black, whereby it is possible to reduce dropouts by virtue of the antistatic effects of carbon black, and at the same time the weakness of carbon black is complemented, and the back coating layer is made tough and free from abrasion, and the elasticity is improved so that the formation of fine cracks in the back coating layer can be avoided. Further, the back coating layer will have a proper stiffness, whereby the cinching phenomenon can be avoided. Thus, it is possible to obtain an improved magnetic recording medium.

The magnetic recording medium of the present invention can be used in a wide range of various fields such as audio tapes, video tapes, computers and magnetic discs.

Now, the present invention will be described in further detail with reference to Examples. However, it should be understood that the present invention is by no means restricted by these specific Examples.

EXAMPLES (1) Formation of magnetic layers

Magnetic layer 1 (radiation curable magnetic layer)

|  | Parts by weight |
| --- | --- |
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black (antistatic Mitsubishi Carbon Black MA-600) | 5 |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following binder composition was thoroughly mixed and dissolved.

|  | Parts by weight |
| --- | --- |
| Acrylic double bond-introduced saturated polyester resin | 10 (as solid content) |
| Acrylic double bond-introduced vinyl chloride-vinyl acetate copolymer | 10 (as solid content) |
| Acrylic double bond-introduced polyether urethane elastomer | 10 (as solid content) |
| Solvent (MEK/toluene: 50/50) | 200 |
| Lubricant (higher fatty acid-modified silicone oil) | 3 |

The binder mixture was introduced into the ball mill wherein the magnetic powder was previously treated, and the mixture was again mixed and dispersed for 42 hours.

The magnetic coating material thus obtained was applied onto a polyester film having a thickness of 15 $\mu$m, and oriented on a permanent magnet (1600 gauss). After evaporating the solvent by means of a infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Magnetic layer 2

The following mixture was applied onto a polyester film in a thickness of 3.5 $\mu$m, followed by electron beam curing and calender treatment.

|  | Parts by weight |
| --- | --- |
| Fe—Co—Ni alloy powder (Hc = 1200 Oe, long axis: 0.4 $\mu$m, short axis: 0.05 $\mu$m, BET specific surface area: 52 m$^2$/g) | 100 |
| Vinyl chloride-vinyl acetate-vinyl alcohol copolymer (VAGH, manufactured by Union Carbide Co.) | 15 |
| Polyvinyl butyral resin | 10 |
| Acrylic double bond-introduced urethane | 10 |
| Methyl ethyl ketone/toluene (50/50) | 250 |

Magnetic layer 3 (Ferromagnetic thin film 1)

A polyester film having a thickness of 12 $\mu$m was moved along the circumferential surface of a cylindrical cooling can, and an alloy comprising 80% of Co and 20% of Ni was melted and obliquely vapor deposited only at a portion having an angle of incidence of from 90° to 30°, in a chamber kept under a vacuum degree of $1.0 \times 10^{-4}$ Torr while circulating $O_2$+Ar (a volume ratio of 1:1) at a rate of 800 cc/min, whereby a Co-Ni-O thin film having a thickness of 0.15 $\mu$m was formed. Oxygen was localized at the interface with the base and at the surface on the opposite side of the base. The surface on the opposite side of the base was covered substantially solely by the oxide. Hc=1000 Oe. The average oxygen content in the thin film was 40% as the atomic ratio relative to Co and Ni (O/CoNi$\times$100).

Magnetic layer 4 (Ferromagnetic thin film 2)

A polyester film having a thickness of 12 $\mu$m was moved along the circumferential surface of a cylindrical cooling can, and vapor deposition was conducted in the same manner as in the case of ferromagnetic thin film 1, in a chamber having a vacuum degree of $5.0 \times 10^{-6}$ Torr. The film thus formed had a thickness of 0.15 $\mu$m and consists substantially of Co-Ni.

This tape was forcibly oxidized in an atmosphere at 90° C. under relative humidity of 20%. The surface on the opposite side of the base was covered with the oxide. Hc=900 Oe. The average oxygen content in the thin film was 45% as the atomic ratio relative to Co and Ni.

(2) Formation of back coating layers

Back coating composition 1

|  | Parts by weight |
| --- | --- |
| Inorganic pigment having a Mohs hardness of at least 5 (See Table 1) | 70 |
| Carbon black, 30 m$\mu$m | 20 |
| Curling agent: Colonate L | |
| Lubricant: | |
| Stearic acid | 4 |
| Butyl stearate | 2 |
| Nitrocellulose: | 40 |
| Vinyl chloride-vinyl acetate-vinyl alcohol copolymer (S—lec A manufactured by Sekisui Plastics Co., Ltd.) | 30 |
| Polyurethane elastomer (Essen 5703 manufactured by B.F. Goodrich Co.) | 30 |

-continued

| | Parts by weight |
|---|---|
| Solvent mixture (MIBK/toluene) | 250 |

The ratio of the inorganic pigment to carbon black was 0.5/9.5.

Back coating composition 2

| | Parts by weight |
|---|---|
| $TiO_2$ having a particle size of 0.08 μm | x ⎫ 70 |
| Carbon black having a particle size of 0.02 μm | y ⎭ |
| Acryl-modified vinyl chloride-vinyl acetate-vinyl alcohol copolymer having a molecular weight of 30,000. | 40 |
| Acryl-modified polyurethane elastomer having a molecular weight of 20,000. | 40 |
| Polyfunctional acrylate having a molecular weight of 1,000. | 20 |
| Oleic acid | 4 |
| Solvent mixture (MIBK/toluene) | 250 |

The properties of magnetic recording media obtained by various combinations of the above-mentioned magnetic layers and back coating layers are shown in the following Table.

TABLE 1

| No. | 1 | 2 | 3 | 4 | 5 | 6 | 7 | 8 | 9 |
|---|---|---|---|---|---|---|---|---|---|
| Magnetic layer | 2 | 2 | 2 | 2 | 2 | 2 | 2 | 2 | 2 |
| Back coating layer | $TiO_2$ | $SiO_2$ | $Al_2O_3$ | $SnO_2$ | $\alpha Fe_2O_3$ | $Fe_3O_4$ | $ZrO_2$ | $TiO_2$ | $SnO_2$ |
| Particle size (μm) | 0.1 | 0.1 | 0.05 | 0.2 | 0.2 | 0.2 | 0.05 | 0.02 | 0.7 |
| Surface roughness of the back coating layer (μm) | 0.18 | 0.18 | 0.16 | 0.20 | 0.20 | 0.20 | 0.18 | 0.10 | 0.40 |
| Electromagnetic conversion characteristics C-S/N (dB) 100 Runs at 40° C. under a relative humidity of 80% | 0 | 0 | 0 | −0.2 | −0.2 | −0.2 | 0 | 0 | −0.2 |
| Abrasion of the back coating layer | ◎ | ◎ | ◎ | ◎ | ◎ | ◎ | ◎ | O | ◎ |
| Winding appearance | ◎ | ◎ | ◎ | ◎ | ◎ | ◎ | ◎ | Δ | ◎ |
| Cinching | ◎ | ◎ | ◎ | ◎ | ◎ | ◎ | ◎ | X | ◎ |
| Abrasion of the half guide | ◎ | ◎ | ◎ | ◎ | ◎ | ◎ | ◎ | ◎ | ◎ |

It is evident from Table 1 that those containing an inorganic pigment having a Mohs hardness of at least 5 in their back coating layers showed good results with respect to the abrasion of the back coating layers, the winding appearance and the cinching phenomenon, irrespective of the type of the inorganic pigment. The inorganic pigment having a Mohs hardness of at least 5 preferably has a particle size of from 0.04 to 0.5 μm. The one having a particle size of less than 0.04 μm (No. 8) was so excellent in the surface roughness of the back coating layer that the winding appearance deteriorated and the cinching phenomenon occurred. On the other hand, the one having a particle size exceeding 0.5 μm (No. 9) was inferior in the surface roughness of the back coating layer, whereby the electromagnetic conversion characteristics tended to deteriorate.

Now, the properties of magnetic recording media with a combination of the magnetic layer 1 and the back coating layer 2 are shown in Table 2, as observed by varying the ratio of the inorganic pigment having a Mohs hardness of at least 5 to the carbon black.

TABLE 2

| No. | 10 | 11 | 12 | 13 | 14 | 15 |
|---|---|---|---|---|---|---|
| $TiO_2$ | 10 | 5 | 2 | 1 | 0.5 | 0 |
| Carbon black | 0 | 5 | 8 | 9 | 9.5 | 10 |
| Surface roughness of the back coating layer (μm) 100 Runs at 40° C. under a relative humidity 80% | 0.20 | 0.18 | 0.18 | 0.18 | 0.18 | 0.18 |
| Abrasion of the back coating layer | ◎ | ◎ | ◎ | ◎ | ◎ | X |
| Winding appearance | X | ◎ | ◎ | ◎ | ◎ | X |
| Cinching | ◎ | ◎ | ◎ | ◎ | ◎ | X |
| Abrasion of the half guide | X | Δ | Δ | ◎ | ◎ | ◎ |
| Dropouts (number/min) | 2000 | 500 | 150 | 50 | 50 | 50 |

As is evident from Table 2, when $TiO_2$ was used alone, the Mohs hardness of at least 5 is so hard that abrasion of the tape guide of the cassette half took place during the repeated running for reproduction. Namely, in the absence of carbon black, abraded particles from the tape guide of the half were likely to deposit on the back coating layer, and substantial dropouts were observed.

When carbon black was incorporated, certain softness was imparted to the back coating layer, whereby abrasion of the tape guide of the cassette half decreased.

When the ratio of $TiO_2$ to carbon black was not higher than 1/9, the adverse effect of the hard $TiO_2$ was eliminated, whereby no abrasion of the tape guide of the cassette half was observed. On the other hand, also dropouts were minimized probably because there was no adverse effect of the abrasion of the tape guide of the cassette half or because a substantial amount of carbon black was incorporated.

When carbon black was used alone, abrasion of the back coating layer took place, and inferior results were obtained with respect to the winding appearance and cinching.

The properties of magnetic recoridng media with a combination of a thin metal magnetic layer and a back coating layer, are shown in Table 3.

TABLE 3

| No. | 16 | 17 |
|---|---|---|
| Magnetic layer | 3 | 4 |
| Back coating layer | 1($SiO_2$) | 2(No. 14) |
| Surface roughness of the back coating layer | 0.18 | 0.18 |
| Electromagnetic conversion characteristics C-S/N (dB) 100 Runs at 40° C. under a relative humidity of 80% | 0 | 0 |
| Abrasion of the back coating layer | ◎ | ◎ |
| Winding appearance | ◎ | ◎ |

TABLE 3-continued

| No. | 16 | 17 |
| --- | --- | --- |
| Cinching | ⊙ | ⊙ |
| Dropouts | 100 | 75 |

It is evident that very good properties were obtained also in the case of thin ferromagnetic layers.

The molecular weights of the polymers and oligomers used in the present invention, are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

The various characteristics were measured as follows:

1. Cinching phenomenon (winding appearance)

By means of a commercially available VHS system VTR, a tape was fast forwarded for the entire length and then fast rewound and stopped when the rest of the length was 50 m, and then fast rewound to the end of the tape. Then, the winding condition of the tape was visually observed. Good winding where no space was observed in the tape winding, was designated by or (excellent), and inferior winding where a space was observed in the tape winding, was designated by X. Symbol Δ means "fair".

2. Abrasion of the back coating layer

By means of a comnercially available VHS system VTR, a tape was permitted to run 100 times at 40° C. under a relative humdity of 80%, whereupon the scratches on the back coating surface were observed. Symbol indicates that the surface was very clean; symbol indicates that no stain was observed; and symbol X indicates that substantial stains were observed.

3. Dropouts

By using a VHS deck at 20° C. under a relative humidity of 60%, a single signal of 4 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts.

4. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5\mu$ were employed.

5. Abrasion of the tape guide of the cassette half

By means of a commercially available VHS system VTR, a tape was permitted to run 100 times at 40° C. under a relative humidity of 80%, whereupon the scratches on the tape guide were observed. Symbol indicates that the guide surface was very clean; that no abrasion was observed; Δ indicates that slight abrasion was observed; and X indicates that substantial abrasion was observed.

6. Electromagnetic conversion characteristics

The S/N ratio (relative value) was shown as recorded and reproduced at a major frequency of 5 MHz. A VTR of VHS was modified so that it was capable of measuring upto 5 MHz.

7. Electron microscopic method

The average particle size was measured by a transmission electron microscope by selecting a sample from each tape.

What is claimed is:

1. A magnetic recording medium, comprising:
   (A) a non-magnetic substrate,
   (B) a magnetic recording layer formed on one side of the substrate, and
   (C) a back coating layer formed on the other side of the substrate, said back coating layer containing an inorganic pigment having a Mohs hardness of at least 5 and carbon black, with the amount of the inorganic pigment being at most 1/9 by weight relative to the carbon black.

2. The magnetic recording medium according to claim 1, wherein the magnetic recording layer is composed essentially of a ferromagnetic alloy powder dispersed in a resin binder.

3. The magnetic recording medium according to claim 1, wherein the magnetic recording layer is a thin ferromagnetic film.

4. The magnetic recording medium according to claim 3, wherein the ferromagnetic material of said thin magnetic recording layer is a ferromagnetic alloy selected from the group consisting of Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr and Co-Ni-Cr.

5. The magnetic recording medium according to claim 1, wherein said inorganic pigment is selected from the group consisting of $TiO_2$, $SnO_2$, $SiO_2$, $\alpha$-$Fe_2O_3$, $Fe_3O_4$, $FeS_2$, $MgO$, $ZrO_2$, $SiC$, $Cr_2O_3$, garnet, $K_2O$, $BeO$, $Al_2O_3$, $NiO$, $FeCr_2O_4$, $MgTiO_2$, $FeS_2$, $FeAl_2O_4$, $CaTiO_2$, $FeTiO_2$, $MnO_2$, $ZrSiO_4$, $ZnS$, and $ZrO_2$.

6. The magnetic recording medium according to claim 1, wherein said inorganic pigment has a particle size of at most 0.5 $\mu$m.

7. The magnetic recording medium according to claim 1, wherein said inorganic pigment has a particle size of at least 0.04 $\mu$m.

8. The magnetic recording medium according to claim 1, wherein said carbon black is furnace black, channel black, acetylene black, thermal black, lamp black or graphitized carbon black.

9. The magnetic recording medium according to claim 1, wherein said carbon black ranges in particle size from 10 to less than 100 m$\mu$m.

10. The magnetic recording medium according to claim 9, wherein said carbon black has a particle size ranging from 20 to 80 m$\mu$m.

11. The magnetic recording medium according to claim 1, wherein said back coating layer comprises said inorganic pigment and carbon black in a resin binder.

12. The magnetic recording medium according to claim 11, wherein said resin binder is a thermoplastic resin, a thermosetting resin or a reactive resin.

13. The magnetic recording medium according to claim 12, wherein said thermoplastic resin is a member selected from the group consisting of vinyl chloride-vinyl acetate copolymer, a vinyl chloride-vinyl acetate-vinyl alcohol copolymer, a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative, a styrene-butadiene copolymer, a polyester resin, a chlorovinyl ether-acrylate copolymer, an amino resin, and a synthetic rubber thermoplastic resin.

14. The magnetic recording medium according to claim 12, wherein said thermosetting resin or reactive resin is a member selected from the group consisting of a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin and mixtures thereof.

15. The magnetic recording medium according to claim 1, wherein said back coating layer further comprises a lubricant, dispersing agent, antistatic agent, or combinations thereof.

* * * * *

UNITED STATES PATENT AND TRADEMARK OFFICE
CERTIFICATE OF CORRECTION

PATENT NO. : 4,741,954

DATED : May 3, 1988

INVENTOR(S) : Toshiaki IDE, et al.

It is certified that error appears in the above-identified patent and that said Letters Patent is hereby corrected as shown below:

ON THE TITLE PAGE:

The name of the Assignee should be corrected to read as follows:

-- TDK Corporation --

Signed and Sealed this

Thirteenth Day of September, 1988

Attest:

DONALD J. QUIGG

Attesting Officer

Commissioner of Patents and Trademarks